Figure 1:
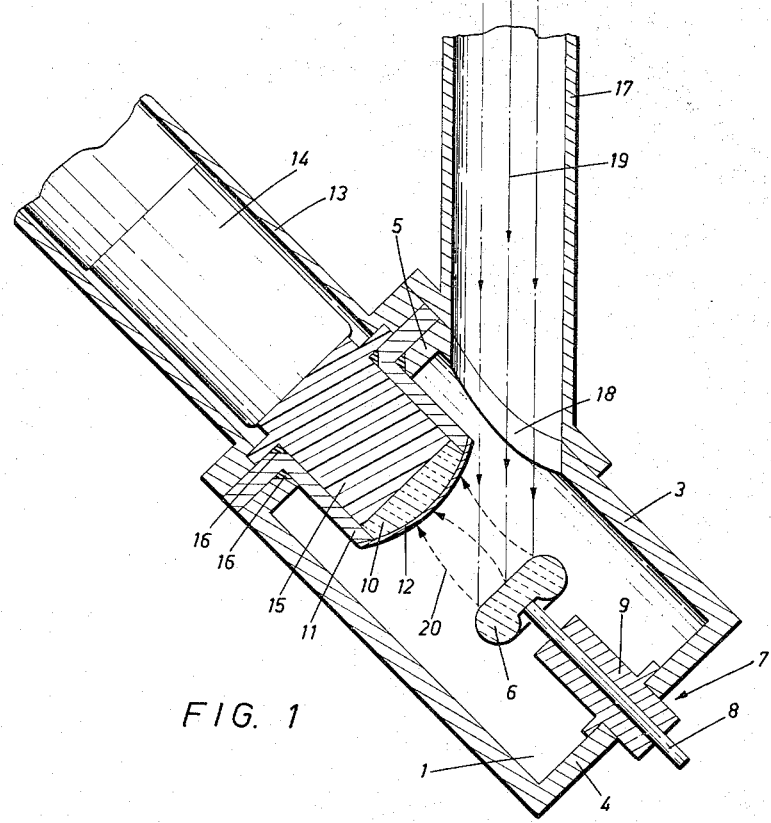

Inventor
WILHELM W. B. SCHUMACHER

Inventor
WILHELM W. B. SCHUMACHER
by: Harold G. Fay
Attorney

Inventor
WILHELM W. B. SCHUMACHER
by: Harold G. Fox
Attorney

United States Patent Office 3,175,083
Patented Mar. 23, 1965

3,175,083
METHOD AND APPARATUS FOR
DETECTING X-RAYS
Wilhelm W. B. Schumacher, Scarborough, Ontario, Canada, assignor to Ontario Research Foundation, Toronto, Ontario, Canada
Filed Dec. 14, 1960, Ser. No. 75,881
12 Claims. (Cl. 250—71.5)

This invention relates to methods and apparatus for detecting X-rays and also to methods and apparatus for analysing X-rays for wavelength and hardness determination.

More particularly, this invention relates to methods and apparatus for detecting and analysing X-rays lying within the complete X-ray spectrum from soft to hard X-rays.

It is a well known fact that X-rays cover a wide range on the electromagnetic spectrum. There are, for example, hard X-rays which have a wavelength from about 0.1 to 2 angstrom units corresponding to an energy of the individual X-ray quantum from 124,000 to 6,200 electron volts. Hard X-rays readily penetrate air, aluminum foils, paper etc. On the other hand, soft X-rays have a quantum energy from approximately 6,200 to 1,500 electron volts and will not travel large distances in air, nor will they penetrate foils of aluminum etc. The same holds true for ultra-soft X-rays which cover the range from approximately 1,000 electron volts, or 12.4 angstroms wavelength, to about 20 electron volts, or 600 angstroms wavelength, where the range of ultra-violet light begins. It will be appreciated, however, that the boundaries between the aforementioned groups are not meant to be very sharply defined.

Since, as is well known, X-rays cannot be seen with the human eye, detectors have to be used to register and analyse them. Various detectors such as a photographic plate, a fluorescent screen, an ionization chamber, a Geiger-Müller counter and a proportional counter, to name the most common ones, have been used for this purpose.

A good X-ray detector must have a high sensitivity to the X-rays which it is supposed to detect, and it should not show excessive spurious responses, either spontaneously or due to heat, light, or other outside influences. As this is sometimes expressed, the signal-to-noise ratio of the detector should be high. Since this electric current is extremely weak, current amplifiers of one kind or another are required for the detection of soft X-rays using this method. Presently, the best scheme for the amplification of this current is the use of an open multiplier-phototube which has no glass envelope and is maintained in the same vacuum as the soft X-rays, the soft X-rays to be detected striking the cathode of this tube without passing through any window. The working principle of this tube is well known, and it is required that a high vacucm in order of $10^{-6}$ mm. of mercury be maintained in order to ensure a suitable amplification factor and a stable sensitivity of the cathode and the secondary cathodes.

It will be noted from the above discussion that no reliable and simple electronic detector for soft X-rays presently exists. When it is realized that X-ray spectrometers, for example, are often limited in their range of application for lack of a suitable soft X-ray detector, the need for a reliable, simple and accurate electronic type of detector for soft X-rays will be apparent.

Accordingly, it is a primary object of my invention to provide a method and apparatus for reliably, simply and electronically detecting X-rays in the soft X-ray range.

It is another important object of my invention to provide such a method and apparatus which, with slight modification, is suitable for detecting X-rays in the soft to hard X-ray range.

A further important object of my invention is to provide a method and apparatus for electronically detecting X-rays in the soft to hard X-ray range and measuring the wavelength thereof.

Yet another important object of my invention is to provide a method and apparatus for electronically detecting X-rays in the soft to hard X-ray range and for measuring the hardness thereof.

In brief, and in accordance with one embodiment of my invention, I provide apparatus for detecting X-rays which comprises an evacuated chamber, an X-ray target positioned in the chamber, so that the X-rays to be detected may fall against the target to cause photoelectrons to be emitted thereby, and accelerating means for accelerating the photoelectrons through the evacuated chamber from the target towards an electron detector. The photoelectrons, having gained energy in the acceleration, impinge on the electron detector and are individually counted thereby. This embodiment of my invention is particularly useful in connection with the detection of soft X-rays.

In another embodiment of my invention which is useful in detecting X-rays in the range from soft X-rays to hard X-rays, a plurality of targets placed one behind the other are provided, and the X-rays are directed against the first target along an axis passing through all of the targets, thus increasing the yield of photoelectrons for hard X-rays which can pass through more than one target.

In another apparatus embodying my invention and used to detect X-rays and measure the hardness thereof, photoelectrons emitted from a series of targets placed behind one another, are accelerated through the evacuated chamber to the electron detector, the photoelectrons from each target being accelerated a different amount, and having, thus, different energies when reaching the electron detector.

In another embodiment of my invention used to detect X-rays and measure the wavelength thereof, a target structure is employed consisting of a number of individual targets, each of a different element. Each target is irradiated individually and successively, and the photoelectrons emitted therefrom accelerated across the evacuated chamber and caused to strike the electron detector, thus determining the yield of photoelectrons as a function of the atomic number of the target.

Broadly speaking, a method for detecting X-rays embodying my invention comprises directing a beam of X-rays against an X-ray target positioned in an evacuated chamber, the X-rays having, as they always do, sufficient energy to cause photoelectrons to be emitted from the target. The photoelectrons are accelerated through the evacuated chamber to a detection level energy and in a direction to cause them to impinge on an electron detector, by means of which they are counted individually.

Figure 2:
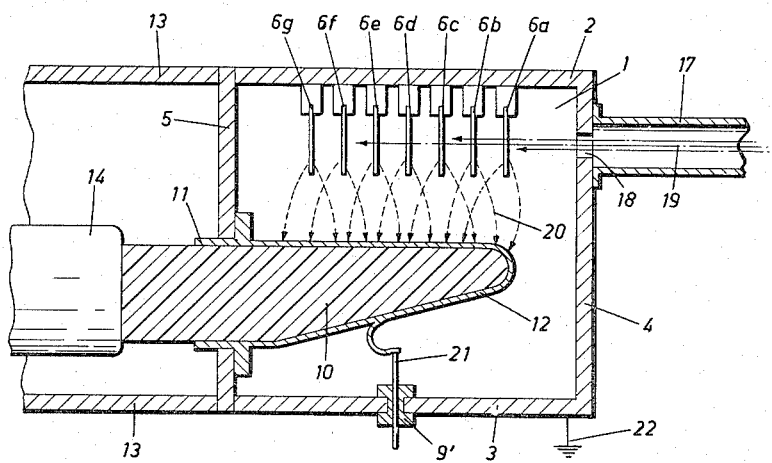
Figure 3:
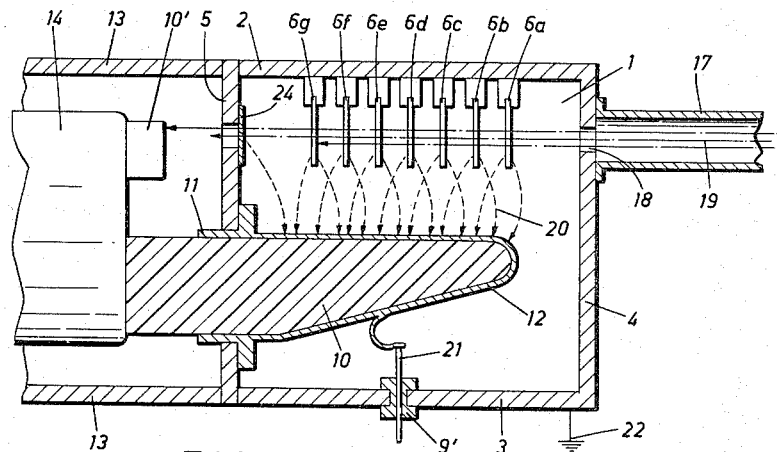
Figure 5:
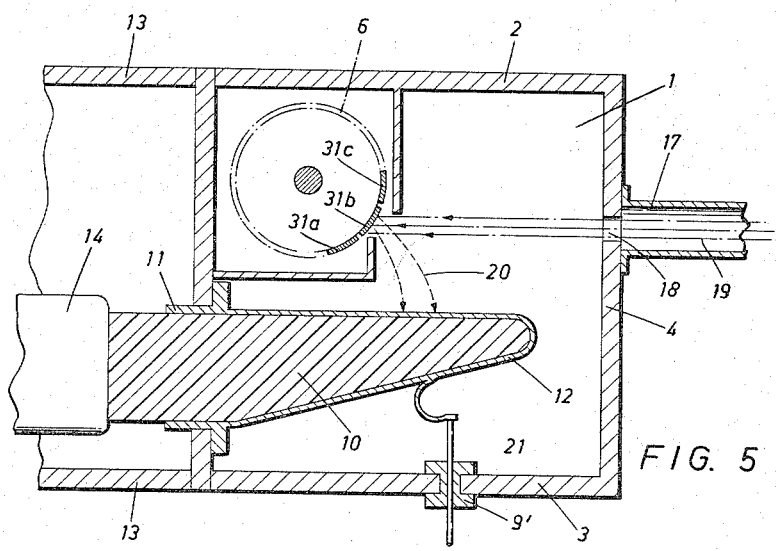
Figure 4:
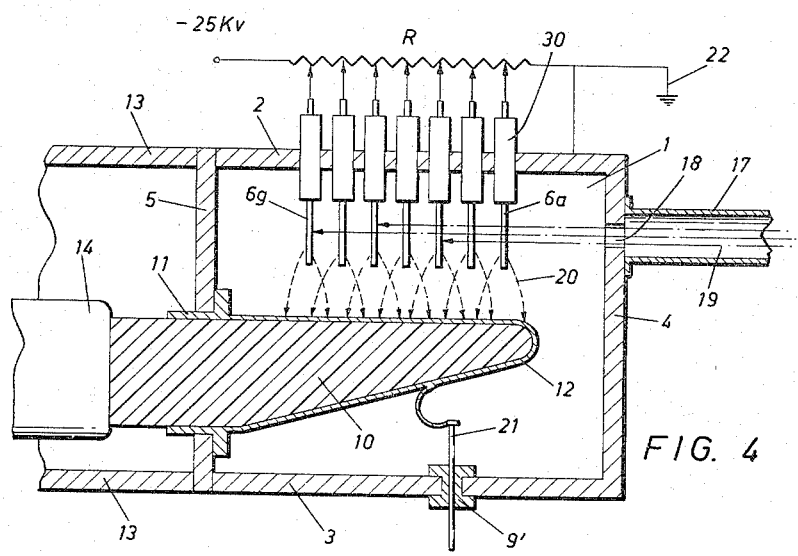

Other objects and advantages of methods and apparatus embodying my invention will become apparent from the following disclosure taken in conjunction with the drawings in which:

FIGURE 1 schematically illustrates, partially in section, one embodiment of apparatus constructed to detect soft X-rays by way of counting photoelectrons after acceleration thereof to a detection level energy;

FIGURES 2 and 3 are schematic representations, partially in section, of apparatus employed to detect X-rays within the range of soft X-rays to hard X-rays;

FIGURE 4 schematically illustrates, partially in section, apparatus embodying my invention for use in connection with the detection of X-rays and the measurement of the hardness thereof; and FIGURE 5 is a schematic representation, partially in section, of apparatus embodying my invention which may be employed to detect X-rays and measure the wavelength thereof.

Referring to FIGURE 1 for a more complete description of apparatus embodying my invention, I have shown an evacuated chamber 1 defined by metal side walls 2 and 3 and metal end walls 4 and 5, the chamber being in the form of a cylinder. Positioned in the chamber, in the path of X-rays, is an X-ray target 6 supported therein by a high voltage connector 7 consisting of a conductor 8 and an insulator 9, the insulator and conductor penetrating end wall 4, the insulator being secured thereto. Also positioned in chamber 1 is a scintillator 10 held in a holder 11 and covered with a light-tight, conductive layer or foil or film 12 which is kept thin enough that electrons of, say, 2 to 20 kiloelectron-volt energy can penetrate it. Film 12, for example, may be of aluminum and may be deposited on the surface by the well-known technique of evaporation under vacuum.

Secured to one end of chamber 1 is a light-tight, cylindrical enclosure 13 having a multiplier phototube 14 positioned therein. The chamber defined by enclosure 13 may be open to the atmosphere. Between the multiplier phototube 14 and scintillator 10 there is a light pipe 15 which may, for example, be made of Lucite. Light pipe 15 is secured to the inner walls of holder 11 in a vacuum tight connection and rubber O-rings 16 are provided for vacuum sealing.

A tube 17 is secured in any suitable manner to the side wall 3 of chamber 1, side wall 3 having an aperture 18 therein. The opposite end of tube 17 to that shown in the figure is connected to the source (not shown) of the X-rays to be detected. Obviously, if the X-rays would pass through the air, tube 17 could be dispensed with and aperture 18 covered by a thin window.

In the operation of the embodiment of my invention illustrated in FIGURE 1, soft X-rays 19 are directed from the X-ray source (not shown) through pipe 17 and aperture 18 and strike target 6 to cause photoelectrons to be emitted thereby. In accordance with my invention, the emitted photoelectrons 20 are accelerated through chamber 1 between the target 6 and on the front face 12 of the electron detector, which in this case consists of scintillator 10, light pipe 15 and photomultiplier tube 14, forming together one type of scintillation counter which is, as such, a well known device. The photoelectrons 20 are accelerated to a detection level energy. As used herein it is to be understood that this term, "detection level energy," refers to the necessary energy that the photoelectrons must possess in order to be detected by the detector. In the embodiment of my invention illustrated in FIGURE 1, photoelectrons 20 are accelerated by means of an electric field established between target 6 and film 12. This electric field is established by a source of high potential (not shown) connected between conductor 8 and film 12, film 12 being more positive than target 6. Alternatively, an electron penetrable wire mesh may be placed in front of scintillator 10 and be maintained at a high positive potential with respect to target 6. It has been found that if photoelectrons 20 are accelerated in this electric field until their energy is between say 5 and 25 kiloelectron-volts, it will be sufficient to permit the photoelectrons to penetrate the foil 12 and cause light pulses to originate in scintillator 10, which are strong enough to be easily detected.

The light pulses originating in scintillator 10 as a result of the electrons impinging thereon, which in turn are due to X-rays falling on target 6, are counted by photomultiplier tube 14, the electrical output signal of the photomultiplier tube being utilized in a well known manner.

Those skilled in the art will appreciate that the scintillation light pulse produced by a photoelectron of say 1 kilo-electron-volt is high enough to give an electric output pulse from photomultiplier device 14 which is well above the height of the thermal or noise pulses of the photomultiplier device itself, even when the device is maintained at room temperature. It should be noted, however, that an electric pulse height discriminator may also be used in connection with the detection of X-rays 19, and, of course, when this is done, any spurious noise signal from the photomultiplier device itself can be completely excluded.

While in the embodiment of the invention shown in FIGURE 1, and in the other figures to be described hereinafter, an electron detector in the form of a scintillator and a photomultiplier tube is employed, it will be realized that other electron detectors may be employed with equal advantage, for example, a Geiger-Müller counter, the only qualification being that the photoelectrons be accelerated to a detection level energy, i.e. to an energy sufficient to permit detection by the detector employed. If a Geiger-Müller counter is used, the electron energy must be made high enough to make the electron penetrate the window of this counter.

The scintillator 10 used to register the electrons can be a very thin crystal of, say, less than one millimeter in thickness. A crystal of anthracene, stilbene, sodium iodide, or any of the well known plastic scintillators may be employed. Since the total volume of the scintillator can be small, it will show very few spurious light pulses due to cosmic radiation or other hard X-rays that may be present. This fact contributes to keeping the spurious counts of the detector very low, as desired.

While in the embodiment of the invention illustrated in FIGURE 1 and in the other figures scintillator 10 is covered with a thin, light-tight foil 12, it will be realized that the presence of this film is not absolutely necessary. However, film 12 allows operation of the detector in the presence of light without overloading the photomultiplier device 14 with light pulses, and the use of the film 12 is convenient. At least when the detector is operated in the dark the lightproof foil can be dispensed with. The face of the scintillator may, then, be covered by a conductive wire mesh.

It will be realized that it is essential that no other electrons but photoelectrons 20 be produced in the range of the electric acceleration field, because they also would be accelerated by the electric field and produce spurious counts in the detector. In order to avoid field emission, the electrodes between which the electric field exists should be kept smoothly polished. In order to avoid gas discharges, a vacuum is maintained. In practice it is important that a sufficiently high vacuum be maintained in order to avoid spurious counts. It has been found by way of experiment that a vacuum of $10^{-4}$ mm. of mercury is sufficient, provided that the electric field gradient is kept low and uniform by using plane electrodes with sufficient spacing therebetween. It will be noted that this value of $10^{-4}$ mm. of mercury compares favourably with the value of $10^{-6}$ mm. of mercury required for operation of open multiplier phototubes. A vacuum of $10^{-4}$ mm. of mercury can be achieved in a metal chamber with rubber or plastic seals and no outgassing at elevated temperatures is required.

While the embodiment of my invention illustrated in FIGURE 1 is particularly suitable for the detection of soft X-rays and even ultra-violet light, it is less effective for detecting harder X-rays, because only a fraction of the hard X-rays are absorbed and, hence, are effective in producing photoelectrons near the surface of target 6. In order to overcome this drop of efficiency, apparatus embodying my invention shown in FIGURES 2 and 3 may be employed. This apparatus will successfully detect X-rays in the range from soft to hard X-rays.

In the embodiment of my invention shown in FIGURE 2 an evacuated chamber 1 is provided being defined by side walls 2 and 3 and having end walls 4 and 5.

Connected to one end of chamber 1 is a light-tight cylindrical housing 13 containing a photomultiplier tube 14. A scintillator 10 projects through end wall 5, is secured therein by an insulating holder 11, and is covered with a thin light-tight foil 12. Foil 12 is an electrical conductor, and is connected through a conductor 21 to a source of high potential of the order of +5 to +25 kilovolts. Conductor 21 is insulated from wall 3 by an insulator 9′. The side and end walls of chamber 1 are of metal and are grounded at 22.

A plurality of targets 6a–6g are provided in evacuated chamber 1 and are maintained at ground potential. These targets consist of a plurality of thin metallic foils placed one behind another.

In the operation of the embodiment of my invention shown in this figure, X-rays 19 are directed from a source (not shown) through tube 17 and aperture 18 in end wall 4 along a line or axis which passes through all of the targets 6a–6g. The X-rays cause photoelectrons 20 to be emitted from at least the first of the targets, i.e. target 6a. Soft X-rays will cause photoelectrons 20 to be emitted from only the first or perhaps two of the targets. Hard X-rays, on the other hand, will pass through a number of the targets and cause photoelectrons to be emitted therefrom. As has been previously discussed in connection with FIGURE 1, photoelectrons 20 are accelerated between the targets and scintillator 10 by the high electric field established between foil 12 and the targets, and are caused to impinge on scintillator 10, the photoelectrons having attained a detection level energy as a result of their acceleration. The light pulses produced in scintillator 10 as a result of the photoelectron impingement thereon are counted by the photomultiplier device 14 whose electrical output signal indicates the presence of X-ray beam 19.

If very hard X-rays are to be detected, it is not necessary to increase the number of targets 6a etc. indefinitely. As is well known, hard X-rays can be easily counted directly by a scintillation counter. Thus the embodiment of my invention shown in FIGURE 3 may be employed. In this embodiment, end wall 5 of chamber 1 is provided with a light-tight window 24 through which X-rays 19 which have passed through all of targets 6a–6g can pass. An additional scintillator 10′ is placed on photomultiplier tube 14 in the path of these X-rays and detects X-rays which pass through all of targets and window 24. Thus, when very hard X-rays are being detected, the electrical output of photomultiplier tube 14 will depend on light pulses produced by photoelectrons 20 emitted from the targets and caused to impinge on scintillator 10 with a detection level energy as well as on light pulses caused by X-rays directly striking scintillator 10′.

While the embodiments of my invention described in FIGURES 1, 2 and 3 are useful in the detection of X-rays, they cannot be used to determine the wavelength or the hardness of the X-rays 19. In FIGURES 4 and 5 I have shown embodiments of my invention which are suitable not only for detecting X-rays but also for determining their hardness and wavelength respectively.

In the embodiment of my invention which is shown in FIGURE 4 and which will not be described hereinafter in detail because it is identical, with some minor exceptions to be hereinafter described, to the embodiment of my invention shown in FIGURES 2 and 3, each of targets 6a–6g is connected to a resistor R through insulators 30. One end of resistor R is connected to a source of negative potential (not shown) of, say, −25 kv., and the other end of which is connected to ground at 22. Under these circumstances it will be apparent that the first target 6a is most positive and the last target 6g is least positive, the intermediate targets grading between these two limits, but all of the targets being less positive than film 12 which is maintained at, say, +5 kilovolts through conductor 21. Hence it will be seen that the largest potential difference and hence the strongest electric field exists between target 6g and film 12, and that the weakest electric field exists between target 6a and the film 12. This being the case, photoelectrons emitted from the targets as a result of impingement of X-ray beam 19 thereon will have an energy dependent upon the strength of the electric field between the target where the photoelectrons originate and film 12. All photoelectrons, however, will have reached a detection level energy.

In the operation of the embodiment of my invention shown in FIGURE 4, it may be assumed that target 6a is at a potential of −1 kilovolt with respect to ground and that the other targets are at potentials of −4, −7, −10, −13, −16, −19, −22 and −25 kilovolts with respect ground. Photoelectrons liberated from the foil 6a as a result from the impingement of X-rays 19 thereon are accelerated towards scintillator 10 as a result of the electric field of six kilovolt existing between target 6a and foil 12, and these photoelectrons produce light pulses in scintillator 10 which appear in the electrical output of photomultiplier tube 14. Photoelectrons emitted from the target 6b are accelerated towards scintillator 10 in an electric field of nine kilovolts and hence have greater energy than those photoelectrons from target 6a. Thus the photoelectrons from the target 6b will cause light pulses in scintillator 10 which are reflected in the electrical output of photomultipler tube 14 as larger electrical pulses than those resulting from the photoelectrons originating from target 6a. If the X-ray beam is hard enough to penetrate all but target 6f, for example, the photoelectrons emitted from target 6f will be accelerated in a field of twenty-seven kilovolts and will produce the largest output pulses in the electrical output of photomultiplier tube 14. Obviously the pulses appearing in the electrical output of photomultiplier tube 14 will be higher, the further in is the last target from which the photoelectrons originate. These pulses may be readily sorted by passing the electrical output of photomultiplier tube 14 into a pulse height analyzer (not shown) which will detect the highest scintillation pulse present. When the highest scintillation pulse present is known, the last target to have photoelectrons originate from it is thereby determined, and the relative hardness of X-rays may then be determined by comparing the positions of the last targets from which photoelectrons originate for various X-ray beams 19. If a multi-channel pulse analyzer is employed, the whole pulse spectrum can be measured at once.

The apparatus shown in FIGURE 4 may be simplified by connecting only one of the targets 6a–6g to a voltage negative with respect to film 12. This voltage than may be switched from target foil to target foil, and the number of photoelectrons from each target determined in a sequential analysis without requiring the use of a pulse height discriminator. In this manner the last target from which photoelectrons originate for any X-ray beam can be determined.

A further possibility for the determination of the hardness of the X-rays exists in the employment of one target foil 6 only, and the placement of a moveable wedge suitably calibrated in front of the target. The wedge will absorb more or less of the X-rays 19 depending on its position. The wedge, for example, may be rotated synchronously with a recorder displaying the count rate. The thickness of the wedge at the point where the wedge is absorbing the X-rays, and hence where no photoelectrons will originate from target 6 and be detected is a measure of the hardness of the X-rays.

In the embodiment of my invention shown in FIGURE 5 which is useful in connection with the detection of X-rays and the measurement of the wavelength thereof, target structure 6 is made up of a multiple number of individual targets 31a, 31b 31c etc. each of the targets being an element of a different atomic number. There may be as many as eighty-five different targets. A normal gaseous element such as nitrogen or oxygen may be present as a compound. Target structure 6 is rotated by suitable means (not shown) in such a manner so that only one of the targets 31a etc. is exposed to X-rays 19 at any one time. The target structure 6 may be rotated with low or high speed and the photoelectron count rate may be displayed on an oscilloscope (not shown) connected to the electrical output of photomultiplier tube 14, with the horizontal deflection of the oscilloscope synchronized with the rotation of target structure 6. In this manner the photoelectron count rate for each element may be measured, the photoelectrons from each target 31a etc. being accelerated to detection level energy by the electric field betwen the target (0 potential) and film 12, impinging on scintillator 10 to cause light pulses, and the light pulse being counted by tube 14, all as previously described.

It is a known fact (from induced emission radiography) that the photoelectron yield obtained with a certain monochromatic radiation changes rather abruptly between those two elements for which the radiation is just above or just below the characteristic K radition (or any other so-called absorption edge) of the elements. Since these absorption edges are known for all the targets 31a etc., and since the photoelectron yield can be determined by counting the photoelectrons with the apparatus shown in FIGURE 5 and in the manner described previously, the X-radiation 19 can be analyzed for its wavelength.

It should be noted that the apparatus can, in addition, be calibrated in absolute yield values, and hence direct wavelength and intensity measurements are possible. An attenuator (not shown) also driven synchronously and having as many steps as there are target surfaces, may be used to adjust for differences in the absolute yield.

It will be appreciated that other counting circuits well known in the art and different detection systems may be used without departing from the main idea of the detector shown in FIGURE 5 which is the measurement of the photoelectron yield as a function of the target surface.

In practising one of the methods embodying my invention and with reference to FIGURE 1, X-rays are detected by directing a beam 19 of X-rays against an X-ray target 6 positioned in an evacuated chamber 1 with sufficient energy to cause photoelectrons 20 to be emitted from target 6. Photoelectrons 20 are accelerated through evacuated chamber 1 to a detection level energy by any suitable means such as an electric field set up between a foil 12 covering scintillator 10 and the target 6. Photoelectrons 20 are accelerated in a direction to cause impingement on scintillator 10, which, together with a photomultipler device 14, forms a scintillation detector, and the photoelectrons are detected and counted individually by the scintillation detector.

In practising another of the methods embodying my invention and with reference to FIGURE 2, X-rays are detected by directing a beam 19 of X-rays along an axis or line passing through a plurality of X-ray targets 6a–6g positioned one behind another in an evacuated chamber 1 to cause photoelectrons 20 to be emitted from at least target 6a. Photoelectrons 20 are accelerated through evacuated chamber 1 to a detection level energy by any suitable means such as an electric field established between the targets and a film or foil 12 covering scintillator 10. The photoelectrons 20 are accelerated in a direction to cause impingement on scintillator 10, which, together with a photomultiplier device 14, forms a scintillation detector, and the photoelectrons are counted by the scintillation detector. In a modification of the aforementioned method, X-rays passing through all of the targets are detected by suitable means such as a scintillator 10' (FIGURE 3).

In another modification of methods embodying my invention and with reference to FIGURE 4, X-rays are detected and their hardness determined by directing a beam 19 of X-rays along an axis or line passing through a plurality of X-ray targets 6a–6g positioned one behind another in an evacuated chamber 1 to cause photoelectrons 20 to be emitted from at least target 6a. Photoelectrons 20 are accelerated through evacuated chamber 1 to a detection level energy by any suitable means such as an electric field established between the targets and a film or foil 12 covering scintillator 10. The photoelectrons from each target are accelerated a different amount and are caused to impinge on scintillator 10, which, with photomultiplier device 14, forms a scintillation detector. The accelerated electrons are detected by the scintillation detector, and the hardness of the X-rays is determined by determining the last target caused to emit photoelectrons.

In practising another method embodying my invention and with reference to FIGURE 5, X-rays are detected and their wavelength measured by providing a plurality of X-ray targets 31a, 31b, etc. of different elements in an evacuated chamber 1, and directing a beam of X-rays 19 successively against each of the targets to cause photoelectrons 20 to be emitted therefrom. The photoelectrons are accelerated through evacuated chamber 1, in a manner previously described, to a detection level energy. The photoelectrons 20 are caused to impinge on a scintillator 10, the light pulses from the scintillator being counted by a photomultiplier tube 14. The wavelength of the X-rays is determined by counting the number of photoelectrons from each target and comparing this number with the known yield of photoelectrons of each target element when irradiated with X-rays having an energy equal to the characteristic X-radiation of the element.

While I have disclosed various embodiments of my invention, it will be apparent that modifications and changes may be made thereto without departing from the spirit and scope of my invention as defined in the appended claims.

What I claim as my invention is:

1. Apparatus for detecting X-rays comprising an evacuated chamber, means permitting X-rays to enter said evacuated chamber, an X-ray target positioned in said chamber and adapted to emit photoelectrons as a result of X-ray impingement thereon, an electron detector comprising a scintillator and a photomultiplier device, said scintillator having a surface exposed to said photoelectrons and on which said photoelectrons impinge after acceleration, said scintillator being adapted to produce a light pulse for each photoelectron of detection level energy impinging thereon, said photomultiplier device being positioned to receive light from said scintillator, and being adapted to produce an electrical output proportional to the light output of said scintillator, means protecting said scintillator and said photomultiplier tube from outside light sources, and accelerating means for accelerating said photoelectrons between said target and said scintillator to a detection level energy.

2. Apparatus for detecting X-rays comprising an evacuated chamber, means permitting X-rays to enter said evacuated chamber, a plurality of X-ray targets positioned in said chamber one behind another, the X-rays to be detected being adapted to impinge against the first of said targets along an axis passing through said targets thereby causing photoelectrons to be emitted by at least said first of said targets, electron detecting means including electron responsive means and electron counting means, said electron responsive means having a surface exposed to said photoelectrons and on which said photoelectrons impinge after acceleration, said electron responsive means being adapted to produce an individual response to each photoelectron of detection level energy impinging thereon, said electron counting means being adapted to count individually said individual responses, and accelerating means for accelerating said photoelectrons through said evacuated chamber between said targets and said electron responsive means to a detection level energy.

3. Apparatus for detecting X-rays comprising an evacuated chamber, means permitting X-rays to enter said evacuated chamber, a plurality of X-ray targets positioned in said chamber one behind another, the X-rays to be detected being adapted to impinge against the first of said targets along an axis passing through said targets, thereby causing photoelectrons to be emitted by at least said first of said targets, an electron detector, said electron detector comprising a scintillator having a surface exposed to said photoelectrons and on which said photoelectrons impinge after acceleration, said scintillator being adapted to produce a light pulse for each photoelectron of detection level energy impinging thereon, and a photomultiplier device positioned to receive light from said scintillator and adapted to produce an electrical output proportional to the light output of said scintillator, and means for accelerating said photoelectrons through said evacuated chamber between said targets and said scintillator to a detection level energy.

4. Apparatus for detecting X-rays according to claim 2 including means for separately detecting X-rays passing through the last of said targets.

5. Apparatus for detecting X-rays and determining the wavelength thereof comprising an evacuated chamber, means permitting X-rays to enter said evacuated chamber, a plurality of X-ray targets of different chemical elements positioned in said chamber, means for positioning each of said targets successively in a target position, the X-rays to be detected being adapted to impinge against each of said targets when in said target position, thereby causing photoelectrons to be emitted successively by said targets, electron detecting means including electron responsive means and electron counting means, said electron responsive means having a surface exposed to said photoelectrons and on which said photoelectrons impinge after acceleration, said electron responsive means being adapted to produce an individual response to each photoelectron of detection level energy impinging thereon, said electron counting means being adapted to count individually said individual responses, and accelerating means for accelerating said photoelectrons through said evacuated chamber between said targets and said electron responsive means to a detection level energy.

6. Apparatus for detecting X-rays and determining the wavelength thereof comprising an evacuated chamber, means permitting X-rays to enter said evacuated chamber, a plurality of X-ray targets of different chemical elements positioned in said chamber, means for positioning each of said targets successively in a target position, the X-rays to be detected being adapted to impinge against each of said targets when in said target position thereby causing photoelectrons to be emitted successively by said targets, an electron detector, said electron detector comprising a sintillator having a surface exposed to said photoelectrons, and on which said photoelectrons impinge after acceleration, said scintillator being adapted to produce a light pulse for each photoelectron of detection level energy impinging thereon, and a photomultiplier device positioned to receive light from said scintillator and adapted to produce an electrical output proportional to the light output of said scintillator, and means for accelerating said photoelectrons through said evacuated chamber between said targets and said scintillator to a detection level energy.

7. Apparatus for detecting X-rays and determining the hardness thereof comprising an evacuated chamber, means permitting X-rays to enter said evacuated chamber, a plurality of X-ray targets positioned in said chamber one behind another, the X-rays to be detected being adapted to impinge against the first of said targets along an axis passing through said targets thereby causing photoelectrons to be emitted by at least said first of said targets, an electron detector having a surface exposed to said photoelectrons, and on which said photoelectrons impinge after acceleration, said detector being adapted to provide output signals proportional to the energy of electrons striking said surface, and means for accelerating said photoelectrons through said evacuated chamber between said targets and said detector to a detection level energy, said accelerating means accelerating photoelectrons from each target a different amount and directly to said electron detector.

8. Apparatus according to claim 7 wherein said electron detector comprises a scintillator having a surface exposed to said photoelectrons, and on which said photoelectrons impinge after acceleration, and a photomultiplier device positioned to receive light from said scintillator and adapted to provide output signals proportional to the energy of photoelectrons striking the surface of said scintillator.

9. A method for detecting X-rays and determining the hardness thereof which comprises directing X-rays along a line passing through a plurality of X-ray targets positioned one behind another in an evacuated chamber to cause photoelectrons to be emitted from at least the first of said targets, accelerating photoelectrons from any one of said targets a different amount than from any other of said targets and through said evacuated chamber to a detection level energy and in a direction to cause impingement of said accelerated photoelectrons on an electron detector, said photoelectrons being accelerated directly from each of said targets to said electron detector, detecting said accelerated photoelectrons with said electron detector, and determining the hardness of said X-rays by determining the last target caused to emit photoelectrons by said X-rays.

10. A method for detecting X-rays and determining the hardness thereof which comprises directing X-rays along a line passing through a plurality of X-ray targets positioned one behind another in an evacuated chamber to cause photoelectrons to be emitted from at least the first of said targets, accelerating photoelectrons from any one of said targets a different amount than from any other of said targets and through said evacuated chamber to a detection level energy and in a direction to cause impingement of said accelerated photoelectrons on a scintillator, said photoelectrons being accelerated directly from each of said targets to said scintillator, counting the light pulses produced in said scintillator by impingement of said accelerated photoelectrons thereon, and determining the hardness of said X-rays by determining the last target caused to emit photoelectrons by said X-rays.

11. A method for detecting X-rays and determining the wavelength thereof which comprises providing a plurality of X-ray targets of different elements in an evacuated chamber directing X-rays against each of said targets successively to cause photoelectrons to be emitted successively therefrom, accelerating said photoelectrons through said evacuated chamber to a detection level energy and in a direction to cause impingement of said accelerated photoelectrons on electron responsive means, said electron responsive means producing an individual response to each photoelectron of detection level energy impinging thereon, counting successively said individual responses from the different targets, thereby measuring changes in photoelectron yield as a function of atomic number, and determining the wavelength of said X-rays from the sudden jump in the photoelectron yield function which occurs with those targets for which the characteristic X-ray wavelength of the target is close to the wavelength of said X-rays to be analysed.

12. A method for detecting X-rays and determining the wavelength thereof which comprises providing a plurality of X-ray targets of different elements in an evacuated chamber, directing X-rays against each of said targets successively to cause photoelectrons to be emitted therefrom, accelerating said photoelectrons through said evacuated chamber to a detection level energy and in a direction to cause impingement of said photoelectrons on a scintillator, counting successively the light pulses produced in said scintillator from the different targets by impingement of said accelerated photoelectrons thereon, thereby measuring changes in photoelectron yield as a function of atomic number, and determining the wavelength of said X-rays from the sudden jump in the photoelectron yield function which occurs with those targets for which the characteristic X-ray wavelength of the target is close to the wavelength of said X-rays to be analysed.

References Cited by the Examiner
UNITED STATES PATENTS

| | | | |
|---|---|---|---|
| 2,563,333 | 851 | Herzog | 250—83.3 |
| 2,636,993 | 4/53 | Jakobson | 250—71.5 |
| 2,730,566 | 1/56 | Bartow et al. | 250—83.6 |
| 2,814,730 | 11/57 | Fechter | 250—49.5 |
| 2,923,824 | 2/60 | Martin et al. | 250—71.5 |
| 2,944,146 | 7/60 | Schultz | 250—71.5 |
| 2,947,871 | 8/60 | Friedman | 250—53 |
| 2,978,587 | 4/61 | Forro | 250—71.5 |
| 2,999,937 | 9/61 | Kohler | 250—71.5 |
| 3,033,984 | 5/62 | Fisher et al. | 250—213 X |

OTHER REFERENCES

Trillat: "Electronic Radiography and Microradiography," Journal of Applied Physics, September 1948, pp. 844–851.

RALPH G. NILSON, *Primary Examiner*.